United States Patent Office 3,356,515
Patented Dec. 5, 1967

3,356,515
HIGH TEMPERATURE PROTECTIVE COATING
Quentin T. McGlothlin, Houston, Tex., assignor to Esso Research and Engineering Company
No Drawing. Filed Dec. 27, 1965, Ser. No. 516,701
17 Claims. (Cl. 106—84)

This application is a continuation-in-part application of Ser. No. 278,441, filed May 6, 1963, entitled "High Temperature Protective Coating," and now abandoned.

The present invention is directed to a pigment package for protective coatings. More particularly, the invention is concerned with high-temperature coatings utilizing a silica-based vehicle. In its more specific aspects, the present invention is concerned with high-temperature coating compositions comprising a silica-based vehicle, a silica sand and a metallic or semimetallic pigment.

The present invention may be briefly illustrated by a high-temperature coating composition which comprises an aqueous vehicle of a lithium-sodium silicate solution, the lithium-sodium silicate being employed in amounts sufficient to provide a molar ratio of lithium oxide to sodium oxide to silicon dioxide, respectively, within the range from about 0.50 to about 1.00; about 0.05 to about 0.25; about 2.5 to about 5.0; a silica sand and a metallic or semimetallic pigment selected from the group of aluminum, nickel, stainless steel and iron alloys thereof having metling points above 1200° F. In its more specific aspects, the invention is concerned with the addition of certain other materials such as zinc dust and color pigments to provide cathodic protection and especially adapted coating compositions.

The coating compositions of the present invention have been specially formulated to provide high temperature coatings. The designation "high-temperature coating" is applied to a protective coating designed for service on metal surfaces which may be operated continuously or for short periods at temperatures in excess of 900° F. Heretofore, the normal industrial coatings were either totally destroyed or rendered ineffective when applied to a surface which had an operating temperature in excess of 900° F. It should be pointed out, however, that the recommended operating temperatures of the coating cannot extend the operating or service temperature recommended for the metal to which it is applied. Accordingly, for a cold-rolled carbon steel the recommended service temperature is about 1000° F., and while the coatings of the present invention may withstand temperatures in excess of 1000° F., the coatings can be no better than the surfaces to which they are applied. The coatings of the present invention have been found suitable for service to temperatures of at least 1750° F. when applied to other than a mild carbon steel. While the coatings of the present invention are designated as high-temperature coatings, they are effective and useful on metal surfaces at temperatures considerably below 900° F.

The present invention is also concerned with the selection of proper pigmentation to formulate satisfactory high-temperature coatings. The selection of the pigment must take into consideration the following: high temperature stability, film flexibility, corrosion resistance, and desirable color. The high-temperature coating compositions of the present invention were formulated taking into considerations all of these aspects of the problem.

According to the present invention, it has been found that the addition of a metallic or a semimetallic pigment when added to a silica-based vehicle together with silica sand produces a coating having high temperature stability and exhibiting sufficient corrosion resistance for a practical coating composition. The metallic pigments which are suitable for the present invention include aluminum, nickel, stainless steel and iron alloys having melting points above about 1200° F. More particularly, the metallic or semimetallic pigments should have a melting point about 250° F. above the maximum service temperature which the coating is to be subjected. The addition of the metal pigments such as metallic aluminum or metallic and semimetallic nickel provides coatings having excellent temperature, shock and heat resistance as well as exhibiting a certain degree of resistance to corrosion.

By the term "semimetallic pigments," it is meant that the pigments are composed of particles having about 50% by weight of the metal around a core of about 50% by weight of either talc or mica. The metal pigments which are preferred are capable of withstanding the temperatures under which the coating will be subjected; that is, temperatures of at least 1650° F. and will not melt or discolor the coating. The metallic pigments have a particle size such that approximately 95 weight percent will pass through a 325-mesh screen.

The addition of the silica sand to the high-temperature coating compositions of the present invention is to provide film flexiblity. By film flexibility is meant that the coating has the ability to contract and expand rapidly as the surface to which the coating is applied undergoes wide temperature variations. The silica sand found suitable for the present invention may be characterized as a sand of small particle size which has the constituency of powder in contrast to a sand having a highly irregular crystalline structure. The preferred sand is commercially available 325-mesh silica sand which means a sand having a size such that it passes through a 325-mesh screen. However, a sand suitable for the present invention may have a particle size within the range such that between about 90 percent to about 100 percent will pass through a 325-mesh screen. While the sand and the vehicle alone will give an excellent coating as far as film flexibility is concerned, it has no corrosion protection property; and accordingly, rusting underneath the film would eventually occur causing such a coating to fail.

In a corrosive atmosphere or to provide a coating having good corrosion protection, zinc dust may be added to the coating compositions of the present invention. This finding was unexpected since the zinc dust was otherwise found unsuitable as a metallic pigment since zinc melts at about 786° F. The addition of the zinc to the high-temperature coating compositions of the present invention which include the vehicle, the sand, and the metal pigment unexplainably will provide excellent high-temperature coatings. The zinc has a particle size between about 2 to about 50 microns in diameter and preferably the particles have a size within the range of 5 and 20 microns in diameter. The zinc may be added in an amount from about 1% to about 60% by weight, and the coatings will display increasing corrosion resistance to the metal, especially carbon steel, as the amount of zinc is increased.

The pigment package of the present invention which consists of a metallic or a semimetallic pigment and silica sand either with or without zinc dust has been found to give high temperature stability to silica-based coatings. The silica-based vehicles may be either organic or inorganic. The organic silica-based vehicle is represented by the tetraethyl-orthosilicate vehicles. Vehicles of this general character are described in U.S. Patent 3,056,684. The inorganic silica-based vehicles are represented by a number of silica solutions made in a number of ways. One type of inorganic coating is made with the use of alkali silicate solutions as vehicles. The sodium silicate solution is the predominant vehicle used in this type of coating. Vehicles of this general character are described in U.S. Patent 2,440,969. Another group of inorganic coatings use an alkali-stabilized colloidal silica as the vehicle. Such a colloidal silica is marketed under the trade name "Ludox" by E. I. du Pont de Nemours and Company, under the trade name "Syton" by Monsanto Chemical Company and under the trade name "Nalcoag" marketed by National Aluminate Company. A vehicle of this general character is described in U.S. Patent 3,130,061.

An especially effective vehicle which produces a self-curing coating is a lithium-sodium silicate vehicle prepared by adding lithium hydroxide which is preferably the monohydrate since it is easier to use and is commercially available, sodium hydroxide and silica-containing materials such as silicic acid and silica gel to water while agitating the same, following which the admixture is heated while continuing the agitation thereof to a temperature within the range from about 75° C. to about 250° C. for a sufficient length of time to form a mixture of lithium and sodium silicates. The sodium and lithium hydroxide and silicate-containing material are used in amounts sufficient to provide a molar ratio of lithium oxide to sodium oxide to silicon dioxide within the range from about 0.50 to about 1.00; about 0.05 to about 0.25; about 2.5 to about 5.0, respectively, following which the admixture is cooled to a temperature within the range from about 20° to about 30° at which temperature any solids go into solution and form an aqueous solution thereof.

The lithium-sodium silicate vehicle may be further described in another manner, i.e., the sodium and the lithium hydroxides and silica-containing material are used in amounts sufficient to provide a molar ratio of lithium oxide to sodium oxide within the range of about 20/1 to about 2/1, and a molar ratio of silicon dioxide to the combined lithium oxide and sodium oxide within the range of about 2.0/1 to about 9.1/1. The same lithium-sodium silicate vehicles are described by the foregoing, and only the manner of expressing the same differs. As is known to the art, the use of the oxide ratios is a means for defining silicate solutions and does not mean that the oxides exist as such.

The preferred lithium-sodium silicate vehicles of the present invention are further characterized as follows: The vehicle has a solids content of between about 25% and about 30% by weight. A vehicle prepared by the preferred method has a total solids content of about 26% to about 27% by weight. The vehicle has a viscosity of between about 30 to about 40 centipoises, the preferred vehicle having a viscosity of between about 36 to about 37 centipoises. The specific gravity of the vehicle may range from about 1.185 to about 1.2. A preferred specific gravity for the vehicle is about 1.194 to about 1.195.

In addition to the coating components previously discussed, certain other materials, generally referred to as pigments, may be added singly, collectively, or in various combinations to impart certain desired properties to the coatings. Several of these "pigment additives" and the desirable characteristics they appear to provide to the coatings of the present invention are as follows:

(1) *Inorganic ceramic pigments (metallic oxides which alone or in various combinations yield desired colors).*—Provide a means of giving these coatings a variety of high temperature resistant colors. Examples of the metallic oxide pigments are cobalt/aluminum, cobalt/chrome, cadmium, and cadmium/aluminum. The preferred pigments are those commonly used in tinting ceramics.

(2) *Zinc oxide pigment.*—Enhances the abrasion resistance and over-all "smoothness" of the coating surface by contributing comparatively minute (0.1–1 micron diameter) particles to the coating formulation.

(3) *Aluminum silico-phosphate pigment.*—Performs the same function as zinc oxide.

(4) *Titanium dioxide pigment.*—In addition to enhancing the abrasion resistance of these coatings, titanium dioxide contributes its excellent hiding properties (brought about by a very high index of refraction) to these coatings.

The preferred coating compositions of the present invention are formulated in accordance with the following general formulas:

| | Wt. Percent |
|---|---|
| Silica-based vehicle | 20–45 |
| Sand | 15–60 |
| Zinc dust | 0–60 |
| Metallic pigment | 1–10 |
| Pigment additives (max.) | 5 |
| Inorganic ceramic pigment | 1–2 |

The foregoing compositions are set forth in weight percent, however, it is understood that the above recited ingredients selected to make up any specific combination would total 100% by weight and accordingly the numerical percentages of the ingredients may also be expressed in parts by weight. The weight percent of the sand and zinc are selected such that the more zinc used the less sand is used. However, when the weight percent of sand is higher, then a higher weight percent of vehicle must be used to keep all solids in solution.

The coating compositions of the present invention are applied to metal surfaces which have been prepared by commercial sandblasting techniques. It is preferred that the metal surfaces be sandblasted to white metal prior to coating. The coating compositions are applied to the surfaces by brushing, rolling or spraying a dry film of about 2 to 12 mils in thickness. A preferred dry film thickness is about 3 to 6 mils. To obtain the preferred dry films, a wet film of about 6 to 10 mils of the coating compositions is applied to the white metal surface.

The present invention will be further illustrated by the following specific examples which are given by way of illustration and not as limitations on the scope of the invention, but which represent the best mode of the present invention.

The lithium-sodium silicate solution without the addition of any additive materials may be formed in the following manner:

*Example 1*

Water, silica gel, lithium hydroxide and sodium hydroxide are charged into a stainless steel pressure vessel equipped with an agitator. During the initial mixing of these ingredients, evolution of heat raises the temperature of the contents to 50° to 55° C. The reactor is then sealed and the temperature of the reactants, under a continual agitation, is raised to 150° C. for a period of time, which may vary from 30 to 90 minutes. After the vessel reaches about 150° C. and about 70 p.s.i. pressure, the contents are slowly cooled at a rate of about 0.61° C. to about 1.83° C. per minute. This will result in a temperature drop from 150° C. to about 95° C. within about 30 to about 90 minutes. This completes the initial part of the reaction which forms the solid sodium-lithium silicates.

The second part of the operation (below 95° C.) requires a longer period of time in order to effectively dissolve the solid silicate at the lower temperatures. The reduction of the temperature of the reactor contents from 95° C. to 40° C. is at a rate of about 0.37° C. to about 0.146° C. per minute and is accomplished in 150 minutes to 240 minutes. The last temperature drop from 40° C. to 25° C. may be conducted over a period of 60 to 120 minutes and a cooling rate of about 0.25° C. to about 0.125° C. per minute.

Depending on the amount of water used, the vehicle may be used in different solid ratios, i.e., the total solids of the vehicle may vary from about 10% to 45% by weight, preferably the solids content is between about 25% to about 30% by weight.

Example II

A vehicle was prepared in the manner similarly described in Example I except it was made of the following ingredients:

| | Parts by wt. |
|---|---|
| Sodium hydroxide | 8 |
| Lithium hydroxide monohydrate | 34 |
| Silica gel | 126 |
| Water | 400 |

This vehicle may be described as $0.75\ Li_2O:0.25\ Na_2O:4.5\ SiO_2$ or having a molar ratio of $Li_2O$ to $Na_2O$ of 3/1 and a molar ratio of $SiO_2$ to the combined $Li_2O$ and $Na_2O$ of 4.5/1. The vehicle had a total solids content of about 27 weight percent but may vary between 26 to 28 weight percent. The viscosity of the vehicle was 36 to 37 centipoises, and the specific gravity was about 1.194 to 1.195.

Example III

A composition was prepared using the following ingredients:

| | Percent |
|---|---|
| Vehicle from Example II | 40.8 |
| 325-mesh sand | 54.2 |

Application of this composition to a sandblasted steel panel indicates a fairly uniform coating which dried in air in about one hour. The steel panel coated with the composition was heated to 1200° F. and immersed in cold water. Upon repeated heating and cooling, the coating showed excellent flexibility characteristics; however, the coating failed when exposed to a 5% salt spray in a salt fog cabinet after only 24 hours due to rusting beneath the film. The composition of this example does not produce a suitable high-temperature coating for normal outside applications, not only because of its failure to prevent corrosion but also because the resulting coating exhibits low abrasion resistance.

The following examples were prepared to illustrate the compositions of the present invention which produce suitable coatings.

Example IV

A coating composition was prepared using the following ingredients:

| | Percent |
|---|---|
| Vehicle from Example II | 43.1 |
| 316-stainless steel flake | 9.2 |
| 325-mesh sand | 47.7 |

Example V

A coating composition was prepared using the following ingredients:

| | Percent |
|---|---|
| Vehicle from Example II | 42.0 |
| Semimetallic nickel | 9.4 |
| 325-mesh sand | 48.6 |

The coating compositions of Examples III, IV, and V all withstood temperatures of 1350° F. for two hours. The following table, however, points out the differences with regard to the corrosion resistance of the coating.

TABLE I

| Material Tested | Corrosion Resistance [1] (144 hrs.; 5% Salt Fog Spray) | Abrasion Resistance [2] percent | Estimated Maximum Operating Temperature [3] (° F.) |
|---|---|---|---|
| Example III | 1.0 | 0.169 | 1,500–1,800 |
| Example IV | 4.5 | 0.601 | 1,500–1,800 |
| Example V | 3.0 | 0.562 | 1,200 |

[1] Rated on the basis of 10=perfect, no corrosion; 0=total failure, very severe corrosion.
[2] Percentage weight loss after 500 cycles with Taber Abrader (1,000 gm. load).
[3] Projected on the basis of short-term laboratory exposures (these exposures range from 1 to 2 hours to 70 days).

The foregoing examples show that the presence of the metallic pigments produces a coating composition wherein the coating formed will have sufficient corrosion and abrasion resistance to produce a suitable coating. Coating compositions such as illustrated by Examples IV and V are suitable for high-temperature applications, especially for decorative applications and where corrosion problems are not severe. These coatings may be used to coat machines, engines and the like which are protected from corrosive atmospheres in some other way than by the coating itself. Additionally, coatings of this composition may be used as coatings for ultrahigh temperature alloys such as Inconel, Austentic Grade 316 stainless steel, etc., which operate in the ranges of approximately 1000° F. to 1800° F. and are themselves protected from corrosion by their inherent nature.

For coating metal surfaces, especially mild carbon steels, which are subject to the weather or other corrosion problems requiring cathodic protection, zinc dust is added to the coating compositions as shown in the following examples.

Example VI

A coating composition was prepared using the following ingredients:

| | Wt. percent |
|---|---|
| Vehicle from Example II | 37.8 |
| 325-mesh silica | 35.8 |
| 316-stainless steel flake | 6.8 |
| Rutile titanium dioxide | 5.3 |
| Zinc dust | 14.3 |

Example VII

A coating composition was prepared using the following ingredients:

| | Wt. percent |
|---|---|
| Vehicle from Example II | 42.2 |
| 325-mesh silica | 36.4 |
| Semimetallic nickel | 7.0 |
| Zinc dust | 14.4 |

Example VIII

A coating composition was prepared using the following ingredients:

| | Wt. percent |
|---|---|
| Vehicle from Example II | 37.7 |
| 325-mesh silica | 25.0 |
| Aluminum flake | 2.7 |
| Zinc dust | 34.1 |

TABLE II

| Material Tested | Corrosion Resistance [1] (300 hrs.; 5% Salt Fog Spray) | Percent Wt. Loss On Taber Abrader (500 cycles, 1,000 gm. wt.) percent | Estimated Maximum Operating Temperature [2] (° F.) |
|---|---|---|---|
| Example IV | 3.25 | 0.601 | 1,500–1,800 |
| Example V | 3.0 | 0.562 | 1,200 |
| Example VI | 7.25 | 0.138 | 1,000–1,200 |
| Example VII | 7.0 | 0.083 | 1,000 |
| Example VIII | 9.5 | 0.053 | 1,200 |

[1] Rated on the basis of 10=perfect, no corrosion; 0=total failure, very severe corrosion.
[2] Projected on the basis of short-term laboratory exposures (these exposures range from 1 to 2 hours to 70 days).

The compositions of Examples VI, VII and VIII all went through 10 cycles of heating to 1200° F. and sudden cooling by immersion in room temperature water. This test served to illustrate the excellent thermal shock resistance of these coatings.

The following coating compositions were prepared to show the effect of the amount of zinc in the composition:

| Example | Wt. Percent of Each Constituent | | | | | | |
|---|---|---|---|---|---|---|---|
| | IX | X | XI | XII | XIII | XIV | XV |
| Vehicle from Example II | 43.1 | 41.5 | 40.1 | 44.0 | 38.6 | 33.2 | 27.2 |
| 325-mesh sand | 47.7 | 44.6 | 43.1 | 35.2 | 30.9 | 26.5 | 19.0 |
| 316-stainless steel flake | 9.2 | 8.5 | 8.2 | 6.7 | 5.9 | 5.3 | 4.8 |
| Zinc dust | 0 | 5.4 | 8.6 | 14.1 | 24.7 | 35.0 | 48.9 |

A coating was applied to steel panels of each of the compositions of Examples IX to XV and tested for corrosion resistance and heat resistance. The results are listed in the following table:

TABLE III

| Material Tested | Corrosion Resistance [1] (300 hours) | Estimated Maximum Operating Temperature [2] (° F.) |
|---|---|---|
| Example IX | 3.25 | 1,500–1,800 |
| Example X | 5.0 | 1,400 |
| Example XI | 7.0 | 1,400 |
| Example XII | 7.5 | 1,000–1,200 |
| Example XIII | 8.0 | 1,000–1,200 |
| Example XIV | 10.0 | 1,100 |
| Example XV | 10.0 | 1,000 |

[1] Rated on the basis of 10=perfect, no corrosion; 0=total failure, very severe corrosion.
[2] Projected on the basis of short-term laboratory exposures (these exposures range from 1 to 2 hours to 70 days).

As can be seen from the results shown in Table III, the coatings are more corrosion resistant with the addition of increasing amounts of zinc, but the coatings become less heat resistant and tend to discolor when the amount of zinc increases over about 50% at a temperature of 1100° F.

A preferred metallic pigment is aluminum powder. Coating compositions of the present invention using aluminum powder as the metallic pigment may be formulated according to the following formula:

| | Percent by weight |
|---|---|
| Silica-based vehicle | 25–40 |
| 325-mesh sand | 15–30 |
| Aluminum powder | 1–10 |
| Zinc dust | 30–55 |
| Color additive pigments | 2–5 |

Specific formulations may be illustrated by the following examples:

*Example XVI*

| | Percent |
|---|---|
| Vehicle from Example II | 31.5 |
| 325-mesh sand | 17.8 |
| Aluminum powder | 1.8 |
| Zinc dust | 48.9 |

*Example XVII*

| | Percent |
|---|---|
| Vehicle from Example II | 29.6 |
| 325-mesh sand | 16.8 |
| Aluminum powder | 1.2 |
| Zinc dust | 49.4 |
| Mixture of cobalt and aluminum oxide color pigment | 3.0 |

The coating compositions of Examples XVI and XVII may be considered substantially the same except for the color pigment of Example XVII which results in a pleasing blue color. Both compositions are characterized by having approximately 50% by weight of zinc dust.

The following coating compositions are characterized by having a zinc dust level of approximately 35% by weight.

*Example XVIII*

| | Percent |
|---|---|
| Vehicle from Example II | 37.7 |
| 325-mesh sand | 25.6 |
| Aluminum powder | 2.6 |
| Zinc dust | 34.1 |

*Example XIX*

| | Percent |
|---|---|
| Vehicle from Example II | 36.8 |
| 325-mesh sand | 22.4 |
| Aluminum powder | 2.2 |
| Zinc dust | 34.7 |
| Mixture of cobalt and aluminum oxide color pigment | 4.0 |

It has also been found that even though the coatings of the above Examples XVIII and XIX will become essentially dry in air in about 30 to 45 minutes, the corrosion resistance of the zinc-enriched coatings can be enhanced by heating the metal surface to which the coatings are applied to a temperature up to about 350° F. Why the corrosion resistance of these coatings is improved upon heating to a temperature of 350° F. is not known. The heating of the surface does not mean that curing is required for these coating compositions; however, the heating of the metal surface will give an improved corrosion resistance to the coating. The heating may be accomplished as the metal is brought to operating conditions.

The following examples were prepared to show the effectiveness of the high temperature pigment package of the present invention in various silica-based vehicles.

*Example XX*

| | Percent |
|---|---|
| Tetraethylorthosilicate solution | 36.4 |
| 325-mesh sand | 15.2 |
| Aluminum powder | 1.1 |
| Zinc dust | 44.6 |
| Mixture of oxide color pigment | 2.7 |

The tetraethylorthosilicate solution used in Example XX was the commercial vehicle of Carbozinc 11, a product of the Carboline Company. The solution contained inert materials and dispersing agents. Suitable coating compositions can be made from commercial tetraethylothrosilicate which has a viscosity within the range of about 5 to 7 centipoises at 20° C.

*Example XXI*

| | Percent |
|---|---|
| Alkali-stabilized colloidal silica (Ludox) | 31.6 |
| 325-mesh sand | 16.3 |
| Aluminum powder | 1.2 |
| Zinc dust | 48.0 |
| Mixture of oxide color pigment | 2.9 |

The alkali-stabilized colloidal silica used in this example was Ludox HS, a product of Du Pont. The Ludox HS colloidal silica has a viscosity of about 5 centipoises at 25° C. and contains about 30% solids. Various other alkali-stabilized colloidal silica may be used and the colloidal silica may contain inert materials such as graphite, or the like, in making the compositions of the present invention.

Example XXII

| | Percent |
|---|---|
| Sodium silicate solution | 33.6 |
| 325-mesh sand | 15.9 |
| Aluminum powder | 1.1 |
| Zinc dust | 46.6 |
| Mixture of oxide color pigment | 2.9 |

The sodium silicate solution used in this example had a $Na_2O:SiO_2$ ratio of about 1:3.2. It had a viscosity of about 10 to 12 centipoises at 77° F. and a solids content of about 25 to 27%.

The coating compositions of Examples XX, XXI and XXII were all subjected to a temperature of 900° F. for seven days and other samples of the same compositions were subjected to a temperature of 1100° F. for five days. Almost all the samples under both conditions had no failures and all samples exhibited excellent film integrity.

Each of the vehicles used in the foregoing examples are materials which are commercially used in industrial coatings. The usual pigment added to the commercial industrial coating composition is zinc. As a basis of comparison, coating compositions were compared using the vehicles of the foregoing examples together with zinc as the pigment and samples of these coatings were subjected to the same conditions; i.e., 900° F. for seven days and other samples at 1100° F. for five days. The latter coating compositions containing zinc as the pigment and subjected to the 900° F. temperature had an average rating, based on 10 being perfect, of about 5. The average rating of those samples containing zinc as the pigment and subjected to 1100° F. was about 3, with some of the coatings completely failing. The coating compositions of Examples XX, XXI and XXII, incorporating the high temperature pigment package of the present invention, on the other hand, had an average rating of about 9 under both 900° F. and 1100° F. conditions.

The nature and objects of the present invention having been completely described and illustrated and the best mode thereof contemplated in carrying out the invention set forth, what I wish to claim as new and useful and secure by Letters Patent is:

1. A coating composition for providing a high temperature coating consisting essentially of an aqueous lithium-sodium silicate vehicle consisting essentially of a lithium-sodium silicate solution, said lithium-sodium silicate being employed in amounts sufficient to provide a molar ratio of lithium oxide to sodium oxide of about 20/1 to about 2/1 and a molar ratio of silicon dioxide to the combined lithium and sodium oxide of about 2.0/1 to about 9.1/1, and said vehicle having a total solids content of between 10 to 45 weight percent; a 325-mesh sand; and a pigment selected from the group consisting of metallic and semi-metallic aluminum, nickel, stainless steel and iron alloys thereof having melting points above 1200° F.

2. A coating composition according to claim 1 which includes an inorganic ceramic pigment of a metallic oxide to provide color.

3. A coating composition according to claim 1 which includes zinc dust in an amount sufficient to provide cathodic protection.

4. A coating composition comprising an aqueous lithium-sodium silicate vehicle consisting essentially of a lithium-sodium silicate solution, said lithium-sodium silicate being employed in amounts sufficient to provide a molar ratio of lithium oxide to sodium oxide of about 20/1 to about 2/1 and a molar ratio of silicon dioxide to the combined lithium and sodium oxide of about 2.0/1 to about 9.1/1, and said vehicle having a total solids content of between 10 to 45 weight percent and being present in an amount between 20 percent and 45 percent by weight; a 325-mesh silica sand present in an amount between 15 percent and 60 percent by weight; a pigment selected from the group consisting of metallic and semi-metallic aluminum, nickel, stainless steel and iron alloys thereof having melting points above 1200° F. present in an amount between 1 percent and 10 percent by weight; and zinc dust present in an amount sufficient to provide cathodic protection and up to 60 weight percent; the amount of said vehicle, sand, pigment, and zinc dust being selected so that as to said vehicle, sand, pigment, and zinc dust the total is 100 weight percent.

5. A coating composition comprising an aqueous lithium-sodium silicate vehicle consisting essentially of a lithium-sodium silicate solution, said lithium-sodium silicate being employed in amounts sufficient to provide a molar ratio of lithium oxide to sodium oxide of about 20/1 to about 2/1 and a molar ratio of silicon dioxide to the combined lithium and sodium oxide of about 2.0/1 to about 9.1/1, and said vehicle having a total solids content of between 10 to 45 weight percent and being present in an amount between 20 percent and 45 percent by weight; a 325-mesh silica sand present in an amount between 15 percent and 60 percent by weight; a pigment selected from the group consisting of metallic and semi-metallic aluminum, nickel, stainless steel and iron alloys thereof having melting points above 1200° F. present in an amount between 1 percent and 10 percent by weight; zinc dust present in an amount sufficient to provide cathodic protection and up to 60 weight percent; and an inorganic ceramic pigment of a metallic oxide to provide color present in an amount between 1 percent and 2 percent by weight; the amount of said vehicle, sand, pigment, zinc dust, and inorganic ceramic pigment being selected so that as to said vehicle, sand, pigment, zinc dust and inorganic ceramic pigment the total is 100 weight percent.

6. A coating composition for providing a high temperature resistant coating consisting essentially of an aqueous lithium-sodium silicate vehicle consisting essentially of a lithium-sodium silicate solution, said lithium-sodium silicate being employed in amounts sufficient to provide a molar ratio of lithium oxide to sodium oxide of about 3/1 and a molar ratio of silicon dioxide to the combined lithium and sodium oxide of about 4.5/1, said vehicle having a total solids content of between 25 to 30 weight percent and being present in an amount between 20 to 45 parts by weight; a silica sand having a size such that between 90 to 100 percent will pass through 325-mesh screen present in an amount between 15 to 60 parts by weight; and a metallic aluminum pigment having a size such that at least 95 percent will pass through a 325-mesh screen present in an amount between 1 to 10 parts by weight.

7. A coating composition according to claim 6 which includes an inorganic ceramic pigment of a metallic oxide to provide color.

8. A coating composition according to claim 6 which includes zinc dust present in an amount sufficient to provide cathodic protection and up to 60 parts by weight.

9. A coating composition for providing a high temperature resistant coating consisting essentially of an aqueous lithium-sodium silicate vehicle consisting essentially of a lithium-sodium silicate solution, said lithium-sodium silicate being employed in amounts sufficient to provide a molar ratio of lithium oxide to sodium oxide of about 3/1 and a molar ratio of silicon dioxide to the combined lithium and sodium oxide of about 4.5/1, said vehicle having a total solids content of between 25 to 30 weight percent and being present in an amount between 20 to 45 parts by weight; a silica sand having a size such that between 90 and 100 percent will pass through a 325-mesh screen present in an amount between 15 to 60 parts by weight; and a pigment selected from the group consisting of metallic and semi-metallic aluminum, nickel, stainless steel and iron alloys thereof having melting points above 1200° F. present in an amount between 1 to 10 parts by weight.

10. A coating composition according to claim 9 which includes zinc dust present in an amount sufficient to provide cathodic protection and up to 60 parts by weight.

11. A composition for providing a high temperature coating consisting essentially of a silica-based vehicle made from a solution selected from the group consisting of tetraethyl-orthosilicate, alkali silicate, and alkali-stabilized colloidal silica, said vehicle having a total solids content of between 10 and 45 weight percent; a 325-mesh silica sand; a pigment selected from the group consisting of metallic and semi-metallic aluminum, nickel, stainless steel and iron alloys thereof having melting points above 1200° F.; and zinc dust in an amount sufficient to provide cathodic protection.

12. A coating composition according to claim 11 which further contains an inorganic ceramic pigment of a metallic oxide to provide color.

13. A coating composition comprising a silica-based vehicle, said vehicle made from a solution selected from the group consisting of tetraethyl-orthosilicate, alkali silicate, and alkali-stabilized colloidal silica, and said vehicle having a total solids content of between 10 and 45 weight percent and being present in an amount between 20 percent and 45 percent by weight; a 325-mesh silica sand present in an amount between 15 percent and 60 percent by weight; a pigment selected from the group consisting of metallic and semimetallic aluminum, nickel, stainless steel and iron alloys thereof having melting points above 1200° F. present in an amount between 1 percent and 10 percent by weight; and zinc dust present in an amount sufficient to provide cathodic protection and up to 60 weight percent; the amount of said vehicle, sand, pigment, and zinc dust being selected so that as to said vehicle, sand, pigment, and zinc dust the total is 100 weight percent.

14. A coating composition according to claim 13 which further contains an inorganic ceramic pigment of a metallic oxide to provide color.

15. A pigment composition for coating compositions which comprises 15 to 60 parts by weight of a 325-mesh silica sand; 1 to 10 parts by weight of a pigment selected from the group consisting of metallic and semi-metallic aluminum, nickel, stainless steel and iron alloys thereof having melting points above 1200° F.; and 1 to 60 parts by weight of zinc dust.

16. A pigment composition according to claim 15 which further includes a maximum of 5 parts by weight of an inorganic ceramic pigment of a metallic oxide to provide color.

17. A pigment composition according to claim 15 wherein said pigment is aluminum.

References Cited

UNITED STATES PATENTS

| | | | |
|---|---|---|---|
| 2,278,970 | 4/1942 | Atwood | 106—291 |
| 2,387,243 | 10/1945 | Castor | 106—291 |
| 2,440,969 | 5/1948 | Nightingall | 117—160 |
| 2,462,763 | 2/1949 | Nightingall | 117—160 |
| 2,509,875 | 5/1950 | McDonald | 106—84 |
| 2,576,845 | 11/1951 | McDonald | 106—84 |
| 2,765,237 | 10/1956 | Drummond | 106—84 |
| 2,886,459 | 5/1959 | Lajoie | 106—290 |
| 2,806,801 | 9/1959 | Leston | 106—84 |
| 2,914,413 | 11/1959 | Mercer | 106—84 |
| 2,944,919 | 7/1960 | Morris et al. | 106—84 |
| 2,998,328 | 8/1961 | Munger et al. | 106—84 |
| 3,075,848 | 1/1963 | Davies et al. | 106—84 |
| 3,100,154 | 8/1963 | Oshima et al. | 106—84 |

FOREIGN PATENTS

| | | |
|---|---|---|
| 433,101 | 8/1935 | Great Britain. |
| 545,962 | 6/1942 | Great Britain. |

OTHER REFERENCES

Greenwood, "Flake Metal Powders and Paint," Paint Manufacture, September 1949.

HELEN M. McCARTHY, *Primary Examiner.*

TOBIAS E. LEVOW, *Examiner.*

S. E. MOTT, *Assistant Examiner.*